(No Model.)
G. W. MOSIER.
DETACHABLE AND ADJUSTABLE HANDLE BAR FOR BICYCLES.
No. 590,402. Patented Sept. 21, 1897.
FIG. 1.
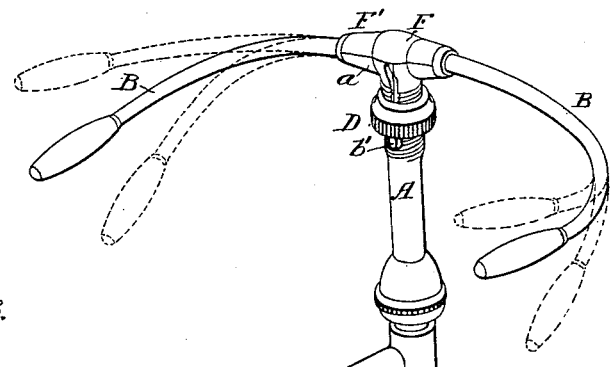
FIG. 3.
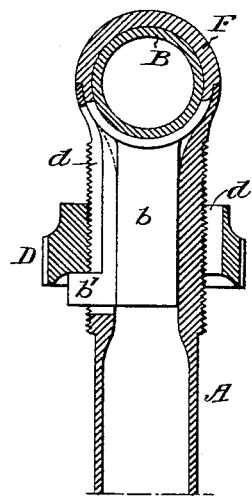
FIG. 4.
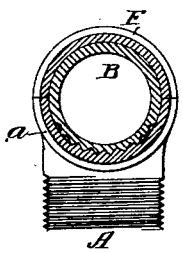
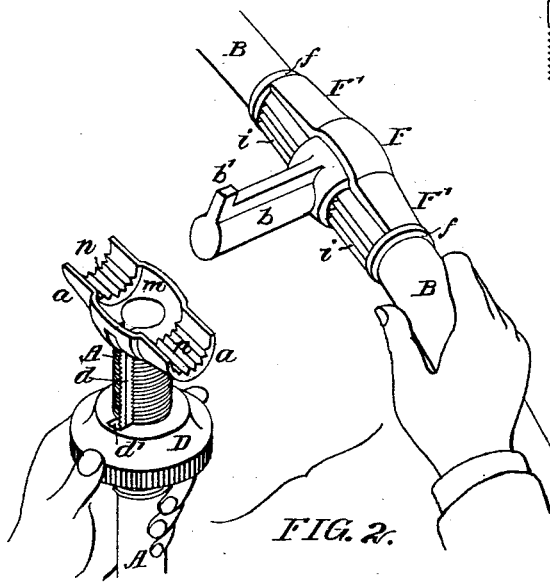
FIG. 2.
Witnesses:
R. Schleicher
Charles DeBow
Inventor:
George W. Mosier
by his Attorneys
Howson & Howson

UNITED STATES PATENT OFFICE.

GEORGE W. MOSIER, OF PHILADELPHIA, PENNSYLVANIA.

DETACHABLE AND ADJUSTABLE HANDLE-BAR FOR BICYCLES.

SPECIFICATION forming part of Letters Patent No. 590,402, dated September 21, 1897.

Application filed December 3, 1895. Serial No. 570,952. (No model.)

*To all whom it may concern:*

Be it known that I, GEORGE W. MOSIER, a citizen of the United States, residing in Philadelphia, Pennsylvania, have invented certain Improvements in Detachable and Adjustable Handle-Bars for Bicycles, &c., of which the following is a specification.

One object of my invention is to so construct a handle-bar attachment for bicycles, tricycles, motor-vehicles, and the like as to provide for the ready application or removal of the same, a further object being to permit of the adjustment of the handle-bar to different positions and the secure locking of the same in position after adjustment. These objects I attain in the manner hereinafter set forth, reference being had to the accompanying drawings, in which—

Figure 1 is a perspective view of part of the steering-head and handle-bar of a bicycle, showing by dotted lines the different positions to which the handle-bar can be adjusted. Fig. 2 is a perspective view, on a larger scale, showing the parts detached from each other and illustrating the details of the construction. Fig. 3 is a transverse section, on a still larger scale, through the central portion of the steering-head and handle-bar, illustrating the means employed for securing the handle-bar in place; and Fig. 4 is a transverse section, on the same scale as Fig. 3, through one of the side portions of the steering-head and handle-bar, illustrating the means employed for effecting different adjustments of said handle-bar.

A represents the upper portion of the steering-head or bar, vertically adjustable in the front portion of the frame, as usual, but instead of having the handle-bar secured to or forming part of the steering-bar the latter has at the top a T-head $a$, and the handle-bar B has a short stem $b$ projecting down into the hollow bar A, and having a projecting lug $b'$, which is adapted to pass through a vertical slot $d$, formed in the rear of the bar A, and through a groove $d'$ in the inner threaded face of a nut D, which is adapted to an external thread formed on the bar A, as shown in Figs. 1 and 2.

When the parts are in the position shown in Figs. 1 and 3, the inner face of the nut D bears firmly upon the projecting lug $b'$ of the stem $b$ and secures the handle-bar rigidly in place, but by unscrewing the nut until the groove $d'$ of the same registers with the lug $b'$ the latter is freed from restraint and the handle-bar can be removed, as shown in Fig. 2, whenever such removal is desired—as, for instance, when the bicycle is left standing in a public place from which it is likely to be stolen. By removing the handle-bar and carrying it with him the rider can provide against theft of the wheel, since the latter without a handle-bar is practically unmanageable, and any one trundling through the streets a bicycle without a handle-bar would at once be open to suspicion and liable to arrest.

The stem $b$ is not rigidly secured to the handle-bar B, but forms part of a collar F, surrounding the central portion of the handle-bar, and having laterally-extending wings F' at the top confined between shoulders $f$, formed upon the handle-bar, so that the latter can be turned in the collar for the purpose of raising or depressing the handles.

In the under side of the handle-bar on each side of the collar F are formed a series of recesses $i$, and on the under side of each lateral portion of the T-head $a$ of the steering-bar, on each side of the recess $m$ therein which receives the collar F, are formed ribs or projections $n$, adapted to enter the recesses $i$, formed in the under side of the handle-bar, the number of the recesses being somewhat in excess of the number of ribs.

When the handle-bar is in place and is locked by means of the nut D, the recesses $i$ in the under side of the handle-bar receive a corresponding set of ribs $n$, and when it is desired to change the position of the handles the nut D is turned backward so as to release or permit slight upward movement of the lug $b'$ and stem $b$, and the handle-bar is then raised until its recesses $i$ are free from the ribs $n$, whereupon the handle can be turned to any desired position and again dropped into position and locked by the nut D. This can readily be done by the rider without dismounting or stopping the machine, since the operations of releasing and readjusting the handle-bar are not such as to cause the rider to lose control of the machine while performing them.

When the device is intended simply for adjustment and not for removability of the handle-bar, the groove in the nut D may be dispensed with.

Having thus described my invention, I claim and desire to secure by Letters Patent—

1. The combination of a slotted steering-bar having at the top a seat or saddle, a handle-bar adapted to said saddle but vertically removable therefrom, a depending stem connected to said handle-bar and projecting down into the steering-bar and having a lug projecting through the slot in the same, and a nut on said steering-bar for engaging with said lug, substantially as specified.

2. The combination of a slotted steering-bar, a handle-bar having a stem with projecting lug, and a nut on the steering-bar for engagement with said lug, said nut having an internal groove for the passage of the lug, substantially as specified.

In testimony whereof I have signed my name to this specification in the presence of two subscribing witnesses.

GEORGE W. MOSIER.

Witnesses:
WILL. A. BARR,
JOS. H. KLEIN.